United States Patent [19]

Lie et al.

[11] 4,245,852
[45] Jan. 20, 1981

[54] TANDEM AXLE SUSPENSION BRACKET ASSEMBLY

[75] Inventors: Tjong T. Lie, Canton; Charles G. Wright, Detroit, both of Mich.

[73] Assignee: Rockwell International Corporation, Pittsburgh, Pa.

[21] Appl. No.: 5,276

[22] Filed: Jan. 22, 1979

[51] Int. Cl.$^3$ .............................................. B60G 5/00
[52] U.S. Cl. ..................................... 280/680; 280/686
[58] Field of Search ............... 280/676, 677, 680, 686; 52/733; 403/380, 381

[56] References Cited

U.S. PATENT DOCUMENTS

| | | | |
|---|---|---|---|
| 966,411 | 8/1910 | Allen | 403/380 |
| 1,335,554 | 3/1920 | Callahan | 403/381 |
| 1,971,200 | 8/1934 | Proctor et al. | 403/380 |
| 2,755,097 | 7/1956 | Elconin | 280/680 |
| 2,784,980 | 3/1957 | Norrie | 280/680 |
| 2,810,587 | 10/1957 | Boughner | 280/680 |
| 2,825,415 | 3/1958 | Boughner et al. | 280/680 |
| 4,090,796 | 5/1978 | Okuda et al. | 403/381 |

*Primary Examiner*—John J. Love
*Assistant Examiner*—Ross Weaver

[57] ABSTRACT

A tandem axle suspension has frame supporting bracket assemblies on opposite sides. Each bracket assembly is connected through springs and torque rods to tandem axle assemblies. Lower torque rods are connected to outer ends of lower brackets. Inner ends of the lower brackets have upward box-like extensions which fit into complementary recesses in lower ends of the main frame supporting bracket. Shear forces which tend to separate the lower brackets from the main brackets, such as during heavy braking, are withstood by the projections and recesses. Crossover tubes fit within lower semicylindrical cavities in the lower brackets and cap plates with complementary upward facing semicylindrical cavities are fastened to the lower brackets to hold the crossover tubes.

13 Claims, 8 Drawing Figures

TANDEM AXLE SUSPENSION BRACKET ASSEMBLY

BACKGROUND OF THE INVENTION

Tandem axle suspension systems conventionally have tandem axle assemblies with ends of the axle assemblies interconnected via springs and torque rods to support brackets which are connected to frame members of a vehicle. Usually, the springs are connected to a heavy trunion or shaft which extends across the vehicle between two frame support brackets on opposite sides of the vehicle. The support brackets are connected to the axle assemblies by spring and stabilizing devices, notably torque rods having proximal ends connected to the brackets and distal ends connected to the axle assemblies.

Conventionally the brackets are constructed in two parts. A main upper portion of each bracket is connected to the frame. A lower bracket is connected to a lower end of a main bracket and a portion of the lower bracket extends out and upward for securing a proximal end of a lower torque rod.

An example of such construction is shown in U.S. Pat. No. 2,810,587.

When vehicles are rolling at constant speed, the torque rods have stresses caused by differences in surfaces upon which the vehicle is moving and vehicle reactions. Stresses on the torque rods are increased upon changes in vehicle speeds, accelerations and decelerations, and are notably increased upon braking. During acceleration and deceleration forces are transferred in the longitudinal direction of the vehicle between the axle assemblies and the frames via the torque rods and support brackets. Longitudinal forces transferred by the lower torque rods, especially the increased forces transferred during rapid braking, are concentrated in the interconnection between the lower bracket and the main bracket.

Conventionally, the shear stresses which have tended to separate the two brackets have been withstood by plural bolts, as an example eight or more bolts which connect each lower bracket to the main bracket. A result has been that repeated shear stresses under severe braking conditions may weaken or fracture or sever one or more bolts. The problem persists and heretofore has not been satisfactorily solved.

SUMMARY OF THE INVENTION

A tandem axle suspension has frame supporting bracket assemblies on opposite sides. Each bracket assembly is connected through springs and torque rods to tandem axle assemblies. Lower torque rods are connected to outer ends of lower brackets. Inner ends of the lower brackets have upward box-like extensions which fit into complementary recesses in lower ends of the main frame supporting bracket. Shear forces which tend to separate the lower brackets from the main brackets, such as during heavy braking, are withstood by the projections and recesses. Crossover tubes fit within lower semicylindrical cavities in the lower brackets and cap plates with complementary upward facing semicylindrical cavities are fastened to the lower brackets to hold the crossover tubes.

Broad objects and features of the invention are accomplished by connecting a lower bracket in a vehicle frame support bracket assembly to a main bracket with interfitting elements which withstand shear forces between the lower bracket and the main bracket.

An object of the invention is to provide a tandem axle suspension for heavy-duty vehicles having tandem axles and spring and stabilizing devices connected to the axles, a frame support bracket assembly connected to the spring and stabilizing devices and to the frame including separable bracket for attaching devices to a main frame supporting bracket, with interfitting shear force withstanding means connected between the main frame supporting bracket and the separable bracket for withstanding shear forces which tend to move the separable bracket with respect to the main frame supporting bracket.

Preferably the interfitting shear force withstanding means comprises first and second parallel extensions on one of the main frame supporting bracket and the separable bracket and complementary recesses on the other of the main frame supporting bracket and separable bracket.

In a preferred embodiment a box-like projection on one of the main frame supporting bracket and separable bracket fits within a complementary recess on the other of the main and separable brackets. Preferably the box-like projection and the recess have complementary inward sloping opposite walls.

In preferred constructions first and second opposite frame support brackets have upward ends which are configured for receiving a vehicle frame, with trunions mounted intermediately on the frame support brackets and holders for receiving and holding proximal ends of torque rods, distal ends of the torque rods being connected to the axles. Fasteners connect lower torque rod end holding brackets to lower ends of the frame support brackets. Box-like projections integrally formed on upper surfaces of the lower torque rod end holder brackets engage complementary recesses formed in lower surfaces of the frame support brackets.

Each lower torque rod end holding bracket has a first inner end configured for interfitting with a lower end of a frame support bracket and has a second outer end configured for receiving and holding torque rod proximal ends.

The lower end of the frame support bracket is generally rectangular and has oppositely extending flanges which extend forward and rearward in a longitudinal direction of a vehicle frame. The inner end of the lower torque rod bracket is generally rectangular and has complementary opposite forward and rearward extending flanges. The flanges have plural complementary fastener receiving holes. A box-like projection is formed on the inner end of the lower torque rod bracket and extends upward from a position between the flanges. The complementary recess formed on the lower end of the frame support bracket and extends upward from a position between the oppositely extending flanges. When fasteners are inserted in the complementary holes in the flanges and are tightened, the box-like projection is drawn up into the recess. Preferably the box-like projection and the recess have complementary inward sloping opposite walls and dimensions of the box-like projection is slightly larger than corresponding dimensions of the recess. When the box-like projection is drawn into the recess, the elements are centered and are secured together in interference fit.

The vehicle has a frame, a tandem axle assembly with a pair of axles extending transversely of and longitudinally spaced beneath the frame. A spring suspension extends between the axles. A bracket assembly pivotally supports the frame on the suspension intermediate the axles, and connects devices for stabilizing the axles relative to the frame longitudinally and transversely of the vehicle. The stabilizing devices include a plurality of transversely spaced pairs of generally longitudinally aligned upper and lower torque rods. One of each of said pairs is connected between the frame supporting bracket assembly and the forward one of the axles; the other of each of said pairs is connected between said frame supporting bracket assembly and the rearward axle. The frame support bracket assemblies are mounted on opposite sides of the vehicle, and transverse connections extend between the bracket assemblies. Each frame support bracket assembly includes a main frame support bracket, having an upper end, and further includes a lower torque rod end holding bracket connected to the lower end of the main bracket. An interfitting shear force withstanding means connects the lower end of the main bracket and the lower torque rod end holding bracket.

The above and further objects and features of the invention are apparent in the disclosure which includes the above and ongoing specification and claims, which are a part of the specification, and the drawings.

DETAILED DESCRIPTION OF THE DRAWINGS

Figure 1:
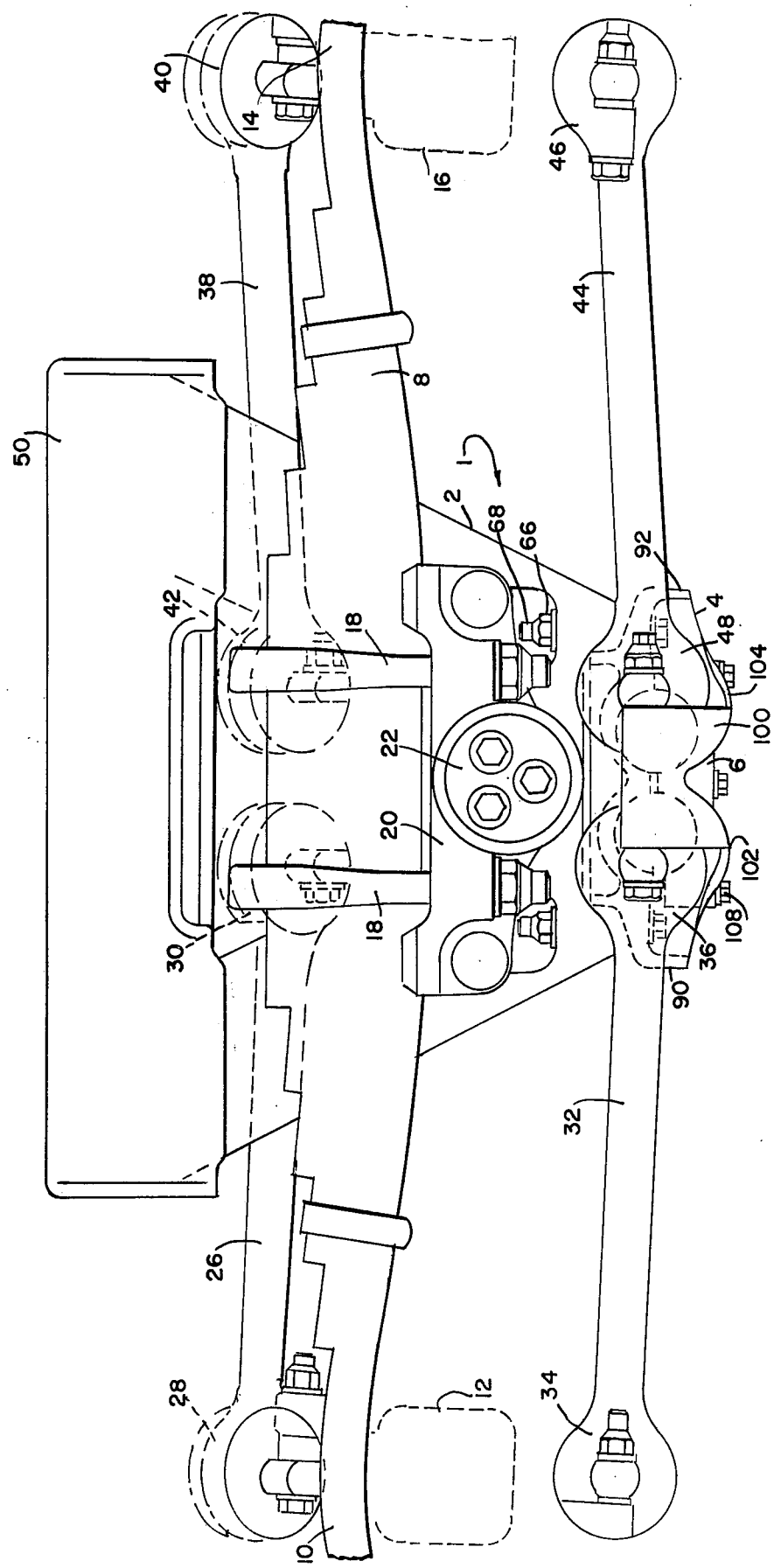
FIG. 1 is a side elevation of a vehicle frame support bracket assembly for a tandem axle suspension system showing a main leaf spring connected to one end of a trunion which is mounted in the main support bracket and showing upper and lower torque rods having proximal ends connected to the frame support bracket and having distal ends configured for connecting to an end of an axle assembly and showing the lower support bracket which holds proximal ends of the lower torque rods.
Figure 3:
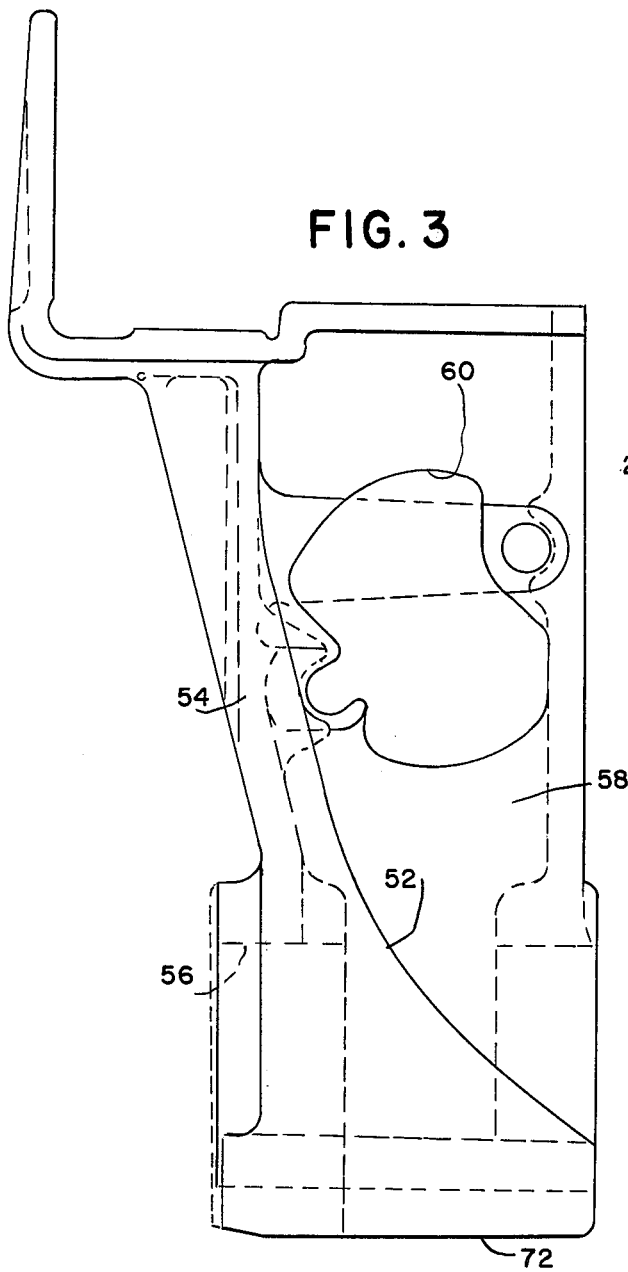
FIG. 3 is an end elevation detail of the main support bracket shown in FIGS. 1 and 2.
Figure 2:
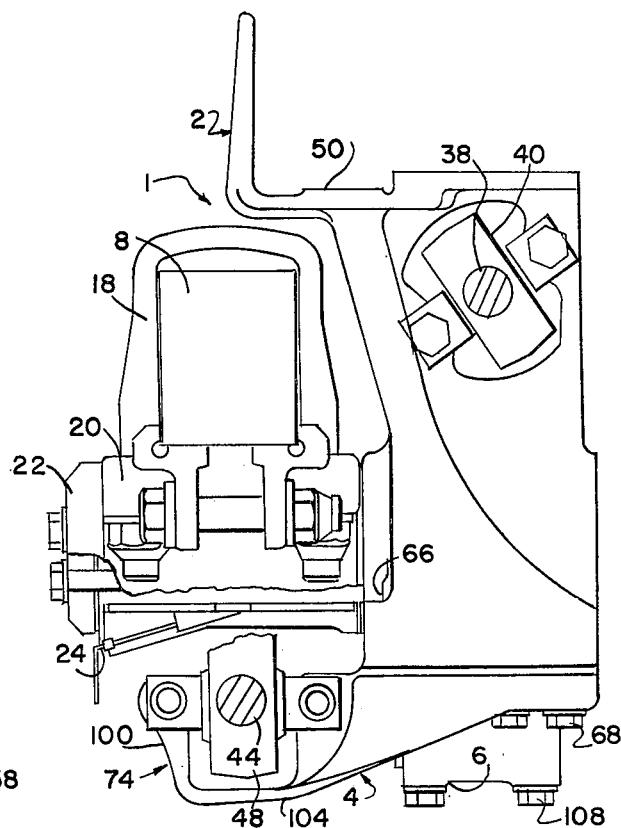
FIG. 2 is an end elevation of the structure shown in FIG. 1.
Figure 5:
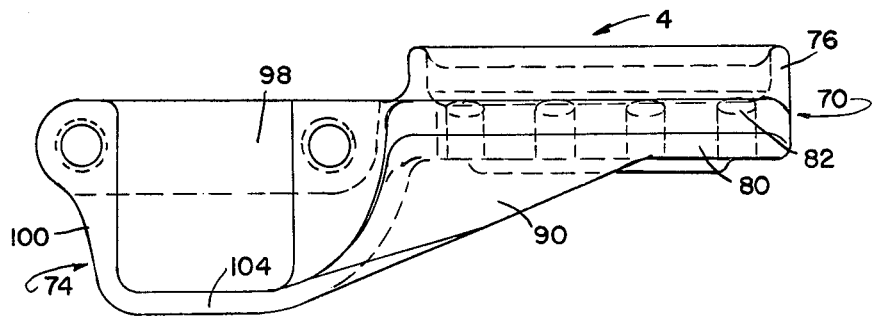
FIG. 5 is an end elevation of the lower support bracket shown in FIGS. 1 and 2.
Figure 4:
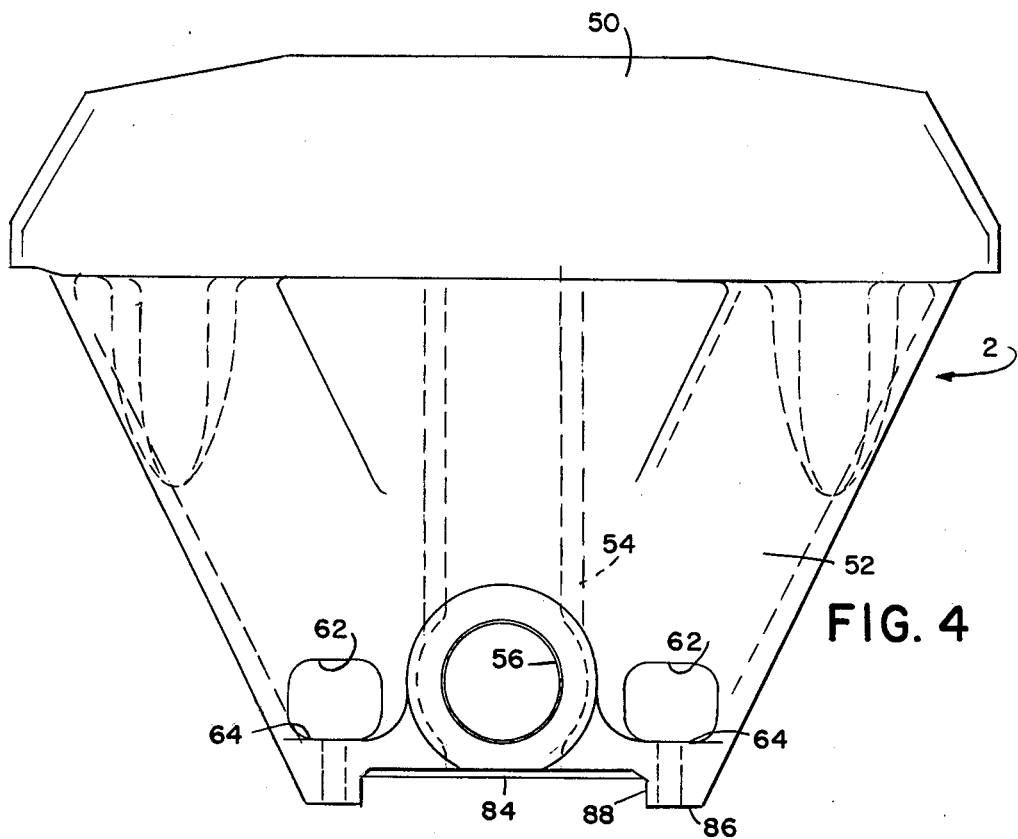
FIG. 4 is a side elevation of the main support bracket shown in FIG. 2.
Figure 6:
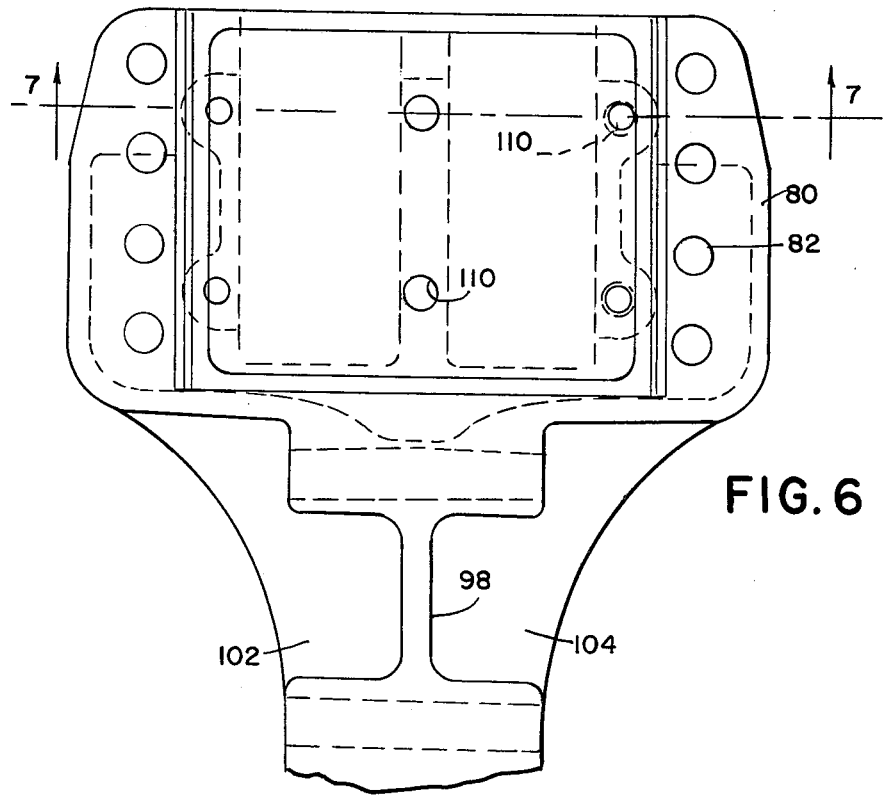
FIG. 6 is a plan view of the lower support bracket shown in FIG. 5.

Referring to FIGS. 1 and 2, a bracket assembly is generally referred to by the numeral 1. Bracket assembly 1 has a main frame supporting bracket 2, a lower bracket 4, and a cap plate 6, as later will be described in detail. A leaf spring 8 has forward end 10 connected to a forward axle assembly 12 in a pair of tandem axles. A rearward end 14 of spring 8 is connected to a rearward axle assembly 16 in the tandem axle pair. U-bolts 18 connect spring 8 to a spring mount 20, which is in turn connected to the trunion 22. A lubricating fitting 24, as shown in FIG. 2, is connected to the spring mount 20. Stabilizing devices in the form of torque rods are connected between the bracket assembly and the forward and rearward axles. Forward upper torque rod 26 has a distal end 28 connected to the forward axle assembly 12. A proximal end 30 of the upper torque rod 26 is connected to the bracket 2 in the manner shown in FIG. 2. A lower forward torque rod 32 has a distal end 34 connected to the forward axle assembly 12. A proximal end 36 of the torque rod 32 is connected to the lower bracket 4 in a manner as shown in FIG. 2.

Upper rear torque rod 38 has a distal end 40 connected to rear axle assembly 16 and a proximal end 42 connected to bracket 2, as shown in FIG. 2. Lower rearward torque rod 44 has a distal end 46 connected to the rear axle assembly 16 and a proximal end 48 connected to lower bracket 4 as shown in FIG. 2.

Referring to FIGS. 1-4, the upper main support bracket 2 of the bracket assembly 1 has a frame receiving portion 50 at its upper end. A generally inward sloping side wall 52 has a central substantially vertical portion 54 in which a reinforced trunion mounting cavity 56 is located. Webs 58 have recesses 60 for receiving proximal ends 30 and 42 of upper torque rods 26 and 38. Through recesses 62 provide access above flanges 64 for inserting nuts 66 on fastener bolts 68 which join the lower bracket 4 to the upper bracket 2.

Referring to FIGS. 1, 2, and 5-8, the lower bracket 4 has a first inner end 70 which is configured for joining to a lower end 72 of main bracket 2. A second outer end 74 of lower bracket 4 is configured for receiving and holding proximal ends 36 and 48 of lower torque rods 32 and 44.

As best seen in FIGS. 5-8, the inner end 70 of lower bracket 4 has an integrally formed upward projection 76 with spaced inward sloping outer walls 78. The upward projection 76 is rectangular and box-like. Flanges 80 extend outward from the box-like projection and have fastener receiving holes 82 through which bolts 68 extend. The projection 76 fits within recess 84 in the lower end 86 of the main bracket 2. The recess 84 has slightly inward and upward sloping forward and rearward walls 88.

The substantially vertical and slightly inward sloping walls 88 of recess 84 correspond with the inward sloping walls 78 of projection 76. Walls 78 fit within walls 88, and tightening bolts 68 and nuts 66 draws projection 76 into recess 84 with walls 78 and 88 centering in interference fit. The forward and rearward walls 90 and 92 of lower bracket 4 are formed in downward continuation of flanges 80 and are joined by webs 94 and 96 to the central wall 98 of the lower bracket 4. Outer wall 100 is joined to the central wall 98 and lower walls 102 and 104 which are joined to webs 94 and 96, forming a rigid cantilevered lower bracket.

Figure 7:
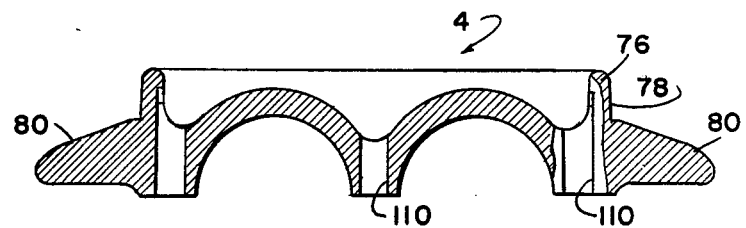
FIG. 7 is a cross-sectional detail of the lower support bracket taken along line 77 of FIG. 6.
Figure 8:
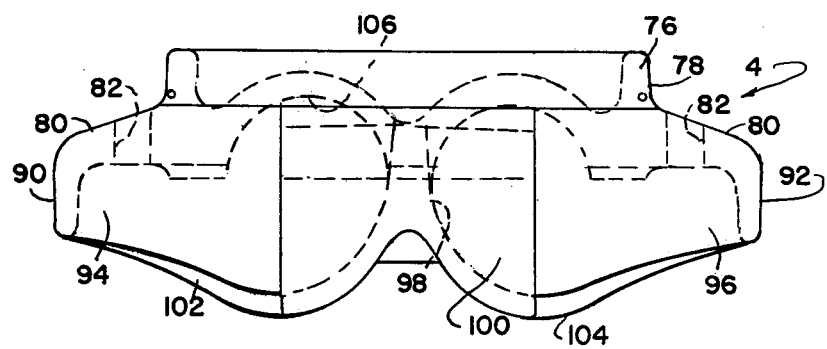
FIG. 8 is a side elevation of the lower support bracket shown in FIGS. 5 and 6.

As shown in FIG. 7, the lower bracket has semicylindrical cavities 106 which receive outer ends of crossover tubes which extend between bracket assemblies on opposite sides of the frame. Cap plate 6 has similar semicylindrical cavities. Six bolts 108 extend through holes in the cap plate 6 into six tapped holes 110 in the lower bracket to secure the cap plate and the crossover tubes to the bracket assembly.

While the invention has been described with reference to a specific embodiment, it will be understood by those skilled in the art that modifications and variations of the embodiment may be constructed without departing from the scope of the invention which is defined in the following claims.

We claim:

1. In a tandem axle suspension for heavy-duty vehicles having tandem axles and spring and stabilizing devices connected to the axles, frame supporting means for supporting a vehicle frame, and connecting means for connecting the spring and stabilizing devices to the frame supporting means, the connecting means including separable means for attaching said stabilizing devices to the frame supporting means and for attaching transversely spaced frame supporting means together, the improvement comprising a projection having spaced sidewalls integrally formed on one of the frame supporting means and the separable means and interfitting with complementary recess means on the other of said frame supporting means and the separable means for withstanding shear forces which tend to slide the separable means with respect to the frame supporting means.

2. The tandem axle suspension of claim 1 comprising a box-like projection on one of the frame supporting means and separable means and a box-like recess on the other of the frame supporting means and separable means.

3. The apparatus of claim 2 wherein the box-like projection and box-like recess have complementary inward sloping opposite walls.

4. The apparatus of claim 2 wherein the frame supporting means comprises first and second opposite frame support brackets having upward ends which are configured as means for receiving a vehicle frame and wherein the connecting means comprise trunions mounted intermediately on the frame support brackets and holding means for receiving and holding proximal ends of torque rods, distal ends of the torque rods being connected to the axles, and wherein the separable means comprise lower torque rod end holding means, and further comprising fastener means for connecting the lower torque rod end holding means to lower ends of the frame support brackets and wherein the box-like projections are integrally formed on upper surfaces of the lower torque rod end holder means and wherein the box-like recesses are formed in lower surfaces of the frame support brackets.

5. The apparatus of claim 4 wherein each lower torque rod end holding means comprises a lower torque rod bracket having a first inner end configured for interfitting with a lower end of a frame support bracket and having a second outer end configured for receiving and holding a torque rod end.

6. The apparatus of claim 5 wherein the lower end of the frame support bracket is generally rectangular and has oppositely extending flanges which extend forward and rearward in a longitudinal direction of a vehicle frame and wherein the inner end of the lower torque rod bracket is generally rectangular and has complementary opposite forward and rearward extending flanges and wherein the flanges have plural complementary fastener receiving holes, the box-like projection being formed on the inner end of the lower torque rod bracket and extending upward from a position between the flanges, and the box-like recess being formed on the lower end of the frame support bracket and extending upward from a position between the oppositely extending flanges, whereby when fastener means are inserted in the complementary holes in the flanges and are tightened, the box-like projection is drawn up into the box-like recess.

7. The apparatus of claim 6 wherein the box-like projection and box-like recess have complementary inward sloping opposite walls and wherein dimensions of the box-like projection is slightly larger than corresponding dimensions of the box-like recess whereby when the box-like projection is drawn into the box-like recess the elements are centered and are secured together in interference fit.

8. In a vehicle having a frame, a tandem axle assembly comprising a pair of axles extending transversely of and longitudinally spaced beneath said frame, a spring suspension extending between said axles, means pivotally supporting said frame on said suspension intermediate said axles, and means for stabilizing said axles relative to said frame longitudinally and transversely of the vehicle, said longitudinal stabilizing means comprising a plurality of transversely spaced pairs of generally longitudinally aligned upper and lower torque rods, one of each of said pairs being connected between said frame supporting means and the forward one of said axles and the other of each of said pairs being connected between said frame supporting means and the rearward one of said axles, said frame supporting means comprising frame support bracket assemblies mounted on opposite sides of the vehicle and transverse connection means separate from said means pivotally supporting said frame and extending between the frame support bracket assemblies, each frame support bracket assembly comprising a main frame support bracket having an upper end configured for connection to a frame and having a lower end and further having a lower torque rod end holding bracket connected to the lower end of the main bracket, and a projection having spaced sidewalls integrally formed on one of the main bracket and lower bracket inter-fitting with complementary recess means on the other of the main bracket and lower bracket to withstand shear forces tending to slide the lower bracket relative to the main bracket.

9. The apparatus of claim 8 comprising a box-like projection on one of the main bracket and lower bracket and a box-like recess on the other of the main bracket and lower bracket.

10. The apparatus of claim 9 wherein the box-like projection and box-like recess have complementary inward sloping opposite walls.

11. The apparatus of claim 9 further comprising fastener means for connecting the lower torque rod end holding brackets to lower ends of the main frame support brackets and wherein the box-like projections are integrally formed on upper surfaces of the lower torque rod end holding brackets and wherein the box-like recesses are formed in lower surfaces of the main frame support brackets.

12. The apparatus of claim 11 wherein each lower torque rod end holding bracket has a first inner end configured for interfitting with a lower end of a main frame support bracket and has a second outer end configured for receiving and holding a torque rod end.

13. The apparatus of claim 12 wherein the lower end of the main frame support bracket is generally rectangular and has oppositely extending flanges which extend forward and rearward in a longitudinal direction of the vehicle frame and wherein the inner end of the lower torque rod bracket is generally rectangular and has complementary opposite forward and rearward extending flanges and wherein the flanges have plural complementary fastener receiving holes, the box-like projection being formed on the inner end of the lower torque rod bracket and extending upward from a position between the flanges, and the box-like recess being formed on the lower end of the frame support bracket and extending upward from a position between the oppositely extending flanges, whereby when fastener means are inserted in the complementary holes in the flanges and are tightened, the box-like projection is drawn up into the box-like recess.

* * * * *